Patented June 4, 1929.

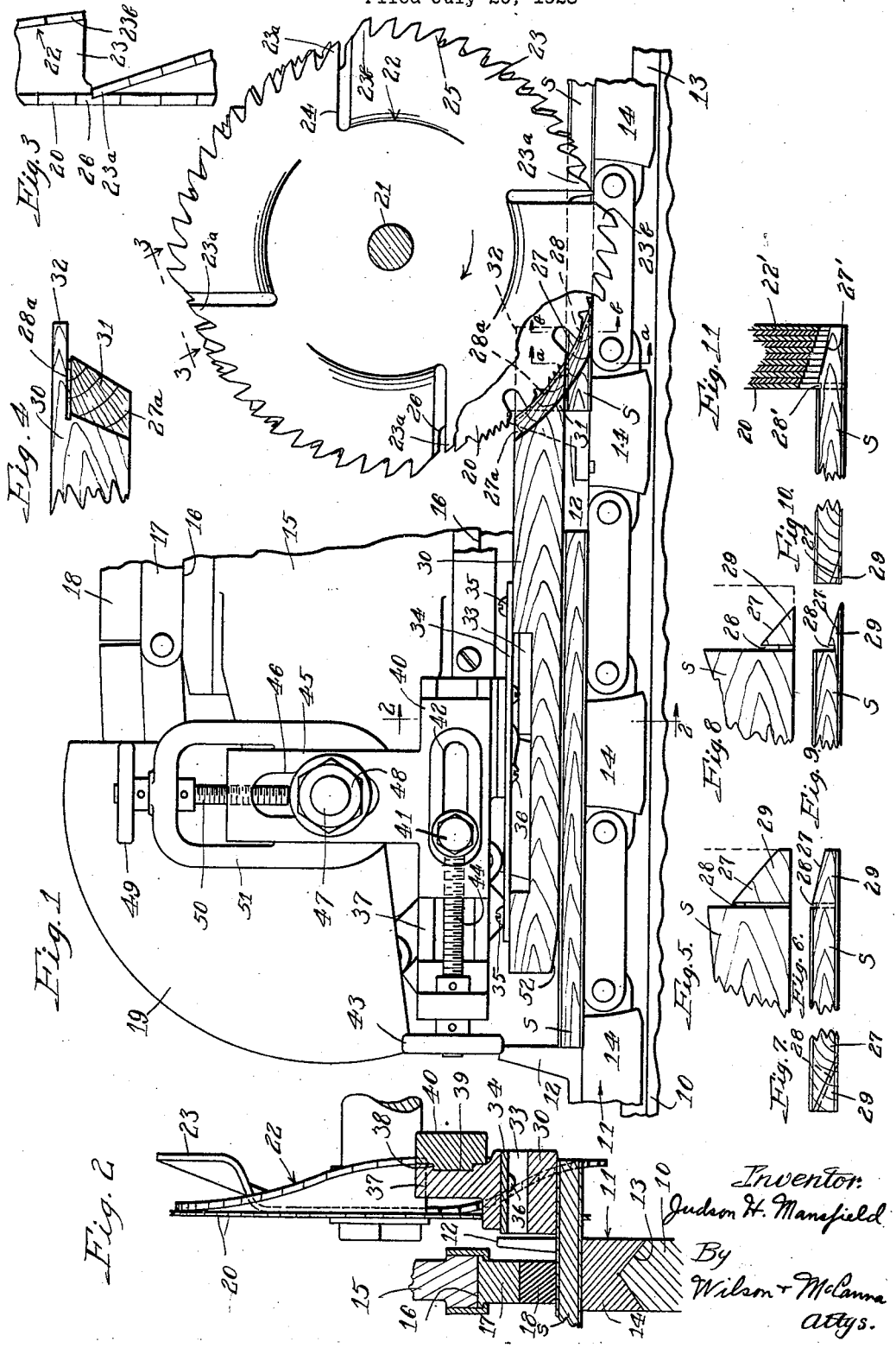

1,715,375

UNITED STATES PATENT OFFICE.

JUDSON H. MANSFIELD, OF ROCKFORD, ILLINOIS, ASSIGNOR TO GREENLEE BROS. & CO., OF ROCKFORD, ILLINOIS, A CORPORATION OF ILLINOIS.

REFUSE CUTTER.

Application filed July 20, 1928. Serial No. 294,079.

This invention relates to improvements in wood-working machines, such as tenoners, and has more particular reference to a refuse cutter adapted for use in combination with a cut-off or trimmer saw.

In the operation of tenoners, or other wood-working machines involving the trimming off of the ends of pieces of stock, refuse cutters have been employed for reducing the scrap or refuse to sawdust, thus permitting the same to be conducted away from the machine through the usual exhaust piping with the rest of the sawdust, shavings, or chips produced in the operation of the machine, instead of having to gather up pieces of scrap from around the machine from time to time and dispose of the same. Refuse cutters heretofore employed were in the form of ordinary straight cutting circular wabble saws which cut up the scrap in line with the cut-off saw so that as the cut-off saw progressed in the work the scrap was disposed of by the refuse cutter. There was, however, the objection that the pressure of the saws against the work was sufficient invariably to cause not only a tearing up of the stock at the end of the cut, due to the upward component involved, but also a splintering back into the board because of the horizontal rearward component also involved as the stock was fed toward the saws. This tearing up and splintering back either meant spoilage of a piece or meant the necessity for patching. It is, therefore, the principal object of my invention to provide, instead of the straight-cutting refuse cutter heretofore employed, an angle-cutting refuse cutter which, by reason of the novel way in which it operates as hereinafter fully described, prevents the tearing up and splintering back so that there is never any spoilage or occasion for patching, the stock being always cut off smooth from beginning to end of the cut.

More specifically stated, some of the features of my invention may be enumerated as follows:

1. The provision of a refuse cutter in the form of a wabble saw in which each of the angularly disposed wabble segments has its toothed periphery extending in an arc eccentric with respect to the saw center, the end of larger radius being disposed in trailing relation to the end of smaller radius, speaking with reference to the direction of rotation of the saw in operation. The ends of all of the segments of smaller radius are, in the operation of the wabble saw alongside the cut-off saw, disposed immediately alongside the cut-off saw, so that the wabble saw cuts on an angle diverging from the cut-off saw with relation to the common axis of the two saws, the operation being equivalent to what would be secured if a plurality of plain circular saws of graduated radii were employed disposed side by side with the smallest immediately alongside the cut-off saw.

2. The provision in connection with a wabble saw for use as a refuse cutter as above described, of a plain circular cut-off saw the radius of which is such that it projects slightly beyond the ends of the segments of smaller radius when the two saws are coaxially arranged for a purpose hereinafter to appear.

3. The provision in the combination of the circular saw and wabble saw of peripheral slots in the circular saw receiving the end teeth of the segments of the wabble saw so that the cut made by the wabble saw will be bound to commence at the cut made by the cut-off saw, no part of the scrap being left uncut.

4. The provision of a hold-down shoe on the pressure beam in the adaptation of the invention to a double-end tenoner bearing on top of the stock on both sides of the cut-off saw to prevent the splintering or tearing of the stock by the saws especially in the case of veneered stock where there would be danger of the veneer breaking loose and splintering back. A special feature of the hold-down lies in the fact that the same is of wooden construction and is arranged to be fed by hand toward the saws as wear on the operating end thereof occurs, thus insuring proper cooperation of the hold-down with the saws for most efficient operation at all times. Still another feature is the provision of means for resiliently mounting the shoe so that slight variations in thickness of pieces of stock is accommodated and the shoe exerts a yielding pressure on the work.

The invention is illustrated in the accompanying drawing, wherein—

Figure 1 is a fragmentary side elevation of a portion of one end of a double-end tenoner showing a new form of wabble saw provided in connection with the cut-off saw in accordance with my invention, the hold-down shoe being also shown mounted on the pressure beam in front of the saws over the feed chain;

Fig. 2 is a section taken on the line 2—2 of Fig. 1 looking toward the saws;

Fig. 3 is an isolated detail showing the inter-engagement of the wabble saw in the slots of the cut-off saw, this view being taken on the line 3—3 of Fig. 1;

Fig. 4 is a fragmentary plan view of the operating end of the hold-down shoe;

Figs. 5, 6 and 7 are, respectively, a plan, rear, and end view of the end of the stock at position $a$—$a$ in Fig. 1, the dotted line in Fig. 5 serving to indicate how the scrap is disposed of progressively as the same is cut off;

Figs. 8–10 are similar views taken at position $b$—$b$ in Fig. 1 showing the condition existing nearer the end of the cut, the dotted lines in Fig. 8 serving to indicate how the projecting stub is shortened as the end of the cut is approached; and Fig. 11 is a view similar to Fig. 6 showing a modified or alternative arrangement wherein a plurality of plain circular saws of graduated radii are provided in connection with the cut-off saw to make an angular cut similar to the wabble saw.

Similar reference numerals are applied to corresponding parts throughout the views.

The present invention, as stated above, finds particular utility in a double-end tenoner of the type shown, for example, in my application Serial No. 186,467, filed April 25, 1927, in disposing of the scrap or refuse at the cut-off saws provided in front of the tenoning heads. It should, however, be understood that the invention is not particularly limited to use on tenoners but is adapted for use on any woodworking machine involving the trimming of stock wherever there is a likelihood of damage due to splintering or tearing of the stock at the end of the cut. In view of the disclosure in the above application it will suffice for the present purposes to state that 10 is a chain beam having the feed chain 11 with its dogs 12 operating along the V-shaped track 13 provided on the top thereof to carry the stock, represented at S, from the in-feed side of the machine through to the out-feed side. The center links 14, as described in said application, have V-grooves milled in the bottoms thereof (see Fig. 2) to fit the V-track 13 so as to prevent any sidewise movement of the stock. Veneered stock is represented in the drawing but it will soon be evident that the present invention has substantially the same utility so far as operating on the plain stock is concerned. A pressure beam 15 is mounted over the feed chain 11 and has tracks 16 on the top and bottom thereof for cooperation with a chain 17 which travels with the work, the same having rubber hold-down pads 18 thereon for engagement with the work. The part shown at 19 is a guard to protect the operator against getting his clothing caught on the chain 17. As described in the application above referred to, a circular cut-off saw 20 is mounted on a shaft 21 constituting the armature shaft of a motor mounted on a housing disposed alongside the beams 10 and 15, there being a cut-off saw so mounted on a stationary right hand housing and another cut-off saw similarly mounted on a left hand housing adjustable toward and away from the right hand housing on the machine base. The spaced relation of the housings, of course, determines the length to which the stock will be cut by the pair of cut-off saws.

Machines of a similar character to the present one have utilized plain straight-cutting circular refuse cutters, such as wabble saws, alongside the cut-off saws for cutting up the scrap or refuse so that the same is reduced to sawdust and can be exhausted in the usual way with the rest of the sawdust and shavings or chips resulting from the operation of the machine. These straight-cutting refuse cutters were, however, objectionable in that they caused damage to the stock at the end of the cut. The stock was invariably torn up and splintered back at the end of the cut and there seemed to be no remedy for the difficulty. When the proposition is analyzed, however, it is found that where a straight-cutting refuse cutter, such as a wabble saw, or its equivalent is used, such as a plurality of plain circular saws of the same radius disposed side by side, the scrap or refuse is, of course, disposed of in line with the progress of the cut-off saw through the work. Now, it will be evident that as the end of the cut is approached the uncut section in front of the cut-off saw is diminished to such a small area that the pressure of the refuse cutter is sufficient to cause a splintering back into the stock, especially when it is considered that the refuse cutter is bearing on a stub of appreciable length and, therefore, has considerable leverage. If, therefore, the length of the stub left as the cut-off saw approaches the end of the cut could be shortened progressively as the uncut section is diminished, then, it will be seen that the danger of tearing up and splintering back would be avoided. I have, as a matter of fact, found by actual construction and use of many machines embodying the improvements now to be described, having the foregoing thought in mind and object in view, that the difficulties referred to have been remedied and the stock is never splintered or torn up at the end of the cut, the cut being always smooth from begining to end.

The refuse cutter provided in accordance with my invention is in the form of an angle-cutting wabble saw 22 mounted on the shaft 21 for rotation with the cut-off saw 20 and has the angularly disposed wabble segments 23 separated by peripheral slots 24 and provided with coarse teeth 26 on the peripheries thereof. The direction of rotation is clockwise, as indicated by the arrow in Fig. 1, and it will be seen that the leading tooth 23$^a$ of each segment is on a substantially smaller radius than the trailing tooth 23$^b$ as a result of the eccentric periphery of each of the wabble segments 23. The leading teeth 23$^a$ are arranged to project into slots 26 provided in the periphery of the cut-off saw 20 (see Figs. 1 and 3) so that the saw 22 is bound to make a cut on the line 27 (see Figs. 5-10) commencing at the cut made by the cut-off saw 20 indicated by the reference numeral 28 in Figs. 5-10. The angularity of the wabble segments 23 is such that the trailing teeth 23$^b$ are laterally displaced with respect to the leading teeth 23$^a$ sufficient to take care of the normal amount of scrap or refuse. That is to say, the swath cut by the wabble saw 22 will ordinarily be more than wide enough to take care of the amount of stock to be trimmed off. It is evident from a comparison of the cuts at 27 and 28 that the cut-off saw 20 is slightly greater in radius than the smaller ends of the wabble segments 23 of the wabble saw 22, that is to say, at the leading teeth 23$^a$ which project into the slots 26 of the cut-off saw. This is primarily for the purpose of insuring that the finer teeth of the cut-off saw 20 will continually mark off in advance the refuse or scrap for disposal by the coarser teeth of the wabble saw 22. In other words, the wabble saw is an accessory to the cut-off saw and its operation should not be allowed to interfere with the smooth cutting of the cut-off saw. At the same time, however, the cut-off saw is not provided of such a radius that it will have such a lead on the wabble saw as would be detrimental to the cooperation of the wabble saw with the cut-off saw in diminishing the length of the stub 29 as the end of the cut 28 is approached in a manner presently to appear. To state it otherwise, the cut-off saw has only sufficient lead on the wabble saw to insure a clean cut; no more. Now, it is also observed that the cut 27 by reason of the eccentric form of the wabble segments 23 of the wabble saw 22 is at an angle diverging from the cut 28 relative to the common axis of the two saws, the axis of the shaft 21. In Fig. 5, the dotted line indicates how the refuse or scrap stock has been disposed of as the cut-off saw progressed through its cut. Now, it will be seen, that the angularity of the cut 27 as the cut-off saw approaches nearer the end of its cut 28 results in a shortening of the stub 29 more and more as the very end of the cut 28 is approached. Without going to the extent of making additional figures in the drawing it is a simple matter to visualize how the stub 29 diminishes to the point of being absolutely eliminated when the end of the cut is actually reached. In other words, as the uncut section in the cut 28 is diminished the length of the stub 29 projecting from the cut is progressively diminished. Hence, the pressure of the refuse cutter, in this case the wabble saw 22, does not have enough leverage on the stub to cause a splintering back or tearing up as was otherwise the case where a full length stub was left projecting to the very end of the cut, allowing full leverage for the refuse cutter to cause a splintering back and tearing up as above described.

Any angle-cutting refuse cutter capable of making the cut 27 would, of course, be an equivalent of the wabble saw 22 and, as an example, there is shown in Fig. 11 a plurality of plain circular saws 22' of graduated radii disposed side by side with the smallest next to the cut-off saw 20 and slightly smaller in radius than the latter to about the same extent as in the case of the leading teeth 23$^a$ of the wabble saw 22, it being observed that the cut 27' made by a composite refuse cutter, such as that shown, is equivalent to the cut 27 (see Fig. 6) and that the cut 28' shown in Fig. 11 is likewise equivalent to the cut 28 of the cut-off saw 20 shown in Fig. 6. Still other forms of angle-cutters adaptable for the present purpose are also regarded as full equivalents.

In Figs. 1 and 4 I have shown a stock hold-down shoe 30 which is made of wood so that the operating end thereof is arranged to be refaced by the saws themselves by simply adjusting the shoe toward the saws whenever the operatitng end looks the worse for wear and is no longer capable of holding the stock in the desired relation to the saws. The operating end of the shoe, as best appears in Fig. 4, is notched out on one side as shown at 27$^a$ by the wabble saw 22 as a flush continuation of the cut 27 and has a saw slot 28$^a$ made by the cut-off saw 20 as a direct continuation of the cut 28 made in the stock by the same saw. Thus, there is one portion of the shoe 30, indicated by the reference numeral 31 in Fig. 4, arranged to bear down on the stock on one side of the cut-off saw 20 right up to the wabble saw 22, and another portion 32 bearing down on the stock on the other side of the cut-off saw. The tendency for the stock to be torn up because of the upward throw of the teeth of both saws is absolutely eliminated and just as smooth a cut is made with veneered stock as with plain stock. The shoe 30 is notched out on the heel portion thereof, as shown at 33, where a leaf spring 34 is fastened on top of the shoe as by means of screws 35. The spring 34 is fastened intermediate its ends, as by means of screws 36, to the under side of a slide 37. The latter has a groove 38 (see Fig. 2) milled longitudinally in one side thereof to receive a projection 39 on a bracket 40 whereby the slide has capacity for endwise movement on the bracket 40 and is held against tilting with respect thereto. A bolt 41 threading into a hole in the slide 37 passes through a slot 42 in the bracket 40 and is arranged when tightened to clamp the slide in adjusted position. The adjustment of the slide on the bracket may be secured in any desired manner although I prefer to provide a hand wheel 43 for turning a screw 44 threading into the bracket 40 as shown. It will be evident that when the bolt 41 is loosened a few turns of the screw 44 by means of the hand wheel 43 will suffice to feed the operating end of the shoe 30 toward the saws 20 and 22 and that after an adjustment has been made the bolt 41 can be tightened. The bracket 40 has the upright arm 45 thereof slotted, as shown at 46, to receive the stud 47 on which the nut 48 is threaded. The latter when tightened serves to clamp the barcket 40 in any position of adjustment as to elevation with respect to the feed chain 11. The adjustment for elevation may, of course, be of any desired form although I prefer to provide a hand wheel 49 for turning a screw 50 threading into the arm 45 of the bracket 40 as shown, the screw 50 being mounted for rotation in a yoke 51 suitably formed integral or otherwise made rigid with the pressure beam 15. It will be seen that when the nut 48 is loosened the bracket 40 can be adjusted up or down so as to raise or lower the hold-down shoe 30 with respect to the feed chain 11, the nut 48 being tightened after the desired adjustment has been made. Now, assuming that the shoe has been set for a certain specified thickness of stock it will be seen that slight variations in thickness will readily be accommodated by the resilience of the leaf spring 34. The infeed end of the shoe is preferably beveled off on its under side, as shown at 52, to allow the stock to enter therebeneath easily. The setting of the shoe should, ordinarily, be such that just enough of a yielding pressure is exerted on the stock to keep it from chattering, the pressure never being great enough to constitute much of a drag on the operation of the machine.

It will be seen that my improvements contribute toward a generally more efficient operating machine and one with which a higher grade of work can be turned out without necessarily involving special skill on the part of the operator. It should be understood, while reference has been made to certain specific details of construction and arrangement, these may be departed from to a certain extent without sacrificing some of the more important advantages. With that in mind the appended claims have been drawn to cover all legitimate modifications and adaptations.

I claim:

1. In a woodworking machine, the combination with a cut-off saw, of a refuse cutter operating alongside the cut-off saw and arranged to cut up the refuse or scrap stock progressively with the operation of the cut-off saw at an angle diverging outwardly from the cut of the cut-off saw with reference to the axis of the latter.

2. In a woodworking machine, the combination with a cut-off saw, of an angle-cutting refuse cutter disposed coaxially with the cut-off saw on the refuse side of the cut, the angle of cut of said cutter diverging outwardly from the cut made by the cut-off saw relative to the common axis of the two saws.

3. In a woodworking machine, the combination with a plain circular cut-off saw, of a wabble saw mounted substantially on a common axis with the latter for rotation therewith on the refuse side of the cut, the angularly disposed wabble segments of the wabble saw extending in rearwardly divergent relation to the cut-off saw speaking with reference to the direction of rotation, and the peripheries of said segments being eccentric so that the leading teeth of said segments are on a smaller radius than the trailing teeth.

4. A structure as set forth in claim 3 wherein the cut-off saw has peripheral slots receiving the leading teeth of the segments of the wabble saw.

5. A structure as set forth in claim 3 wherein the circular saw is of a slightly greater radius than the radius of the leading teeth of the segments of the wabble saw.

6. A structure as set forth in claim 3 wherein the circular saw is of a slightly greater radius than the radius of the leading teeth of the segments of the wabble saw and wherein said cut-off saw has peripheral slots therein receiving the leading teeth of the wabble saw segments.

7. In a woodworking machine, the combination with a plain circular cut-off saw, of a wabble saw mounted substantially on a common axis with the latter for rotation therewith on the refuse side of the cut, the angularly disposed wabble segments of the wabble saw extending in rearwardly divergent relation to the cut-off saw speaking with reference to the direction of rotation, and said cut-off saw having peripheral slots receiving the leading teeth of the segments of the wabble saw.

8. In a woodworking machine, the combination with a cut-off saw for making a plain straight trimming cut, of saw means disposed on the refuse side of the cut presenting cutting teeth in lateral array for cutting up the refuse, the saw means being further of such a form that the laterally arranged teeth define an angle with reference to the axis of the cut-off saw diverging outwardly with reference to the cut made by the latter.

9. A structure as set forth in claim 8 wherein the teeth of the cut-off saw operate on a radius slightly greater than the refuse cutting teeth immediately adjacent the same.

10. A structure as set forth in claim 8 wherein the teeth of the cut-off saw operate on a radius slightly greater than the refuse cutting teeth immediately adjacent the same, and wherein certain of the refuse cutting teeth are in overlapping relation to the plane of action of the teeth of the cut-off saw.

11. A structure as set forth in claim 8 wherein certain of the refuse cutting teeth are in overlapping relation to the plane of action of the teeth of the cut-off saw.

12. A refuse cutter comprising a wabble saw having a plurality of circumferentially arranged segments disposed angularly with reference to the plane of rotation, the segments having the toothed peripheries formed arcuately eccentric with respect to the saw center.

13. A refuse cutter comprising a wabble saw having a plurality of circumferentially arranged segments disposed angularly with reference to the plane of rotation, the segments having the toothed peripheries formed arcuately eccentric with respect to the saw center, and all of the segemnts being of identical form so that the leading teeth of all of the segments are substantially on a common radius and the trailing teeth are all substantially on a common radius.

14. A wabble saw having a plurality of circumferentially arranged segments disposed angularly with reference to the plane of rotation, the segments having the toothed peripheries formed arcuately eccentric with respect to the saw center.

15. A wabble saw having a plurality of circumferentially arranged segments disposed angularly with reference to the plane of rotation, the segments having the toothed peripheries formed arcuately eccentric with respect to the saw center, and all of the segments being of identical form so that the leading teeth of all of the segments are substantially on a common radius and the trailing teeth are all substantially on a common radius.

16. In a tenoner, the combination with stock feeding means, of a cut-off or trimmer saw mounted in a predetermined relation to the stock feeding means to trim off the end of the stock on a straight line previous to the tenoning operation to be performed on the stock, means comprising a power driven shaft having said saw mounted thereon, and a refuse cutter mounted on the same shaft with the cut-off saw on the refuse side of the cut and arranged to cut up the refuse progressively with the operation of the cut-off saw, said refuse cutter being of such a form as to cut on an angle diverging outwardly from the cut of the cut-off saw relative to the axis of the shaft.

17. In a woodworking machine of the character described, the combination with stock feeding means, of a circular cut-off saw disposed alongside the stock feeding means and arranged to trim off the stock on a straight line, a refuse cutter operating with the cut-off saw comprising a wabble saw of such a form as to cut on an angle diverging outwardly from the cut of the cut-off saw relative to the axis of the latter for the purposes herein described, a wooden stock hold-down shoe mounted over the stock feeding means in front of and in line with the two saws, and means arranged for periodically adjusting said shoe toward the saws whereby the operating end thereof is arranged to be profiled by the saws and periodically refaced thereby.

18. In a woodworking machine of the character described, the combination with stock feeding means, of a circular cut-off saw disposed alongside the stock feeding means and arranged to trim off the stock on a straight line, a refuse cutter operating with the cut-off saw comprising a wabble saw of such a form as to cut on an angle diverging outwardly from the cut of the cut-off saw relative to the axis of the latter for the purposes herein described, and a stock hold-down shoe mounted over the stock feeding means in front and in line with the two saws, said shoe having one portion disposed on the inside of the cut made by the cut-off saw and another portion disposed on the outside of the cut, the first portion serving to prevent tearing up of the stock in the operation of the cut-off saw and the latter portion preventing cutting up of the stock in the operation of the wabble saw.

19. In a woodworking machine, such as a tenoner, the combination with a stock feeding chain, of a hold-down shoe disposed above the same, a bracket rigidly mounted on the frame of the machine for supporting said shoe, and a leaf spring providing the mounting for said shoe element on the bracket element, the leaf spring being fastened at its ends to one of said elements and intermediate its ends to the other of said elements.

In witness of the foregoing I affix my signature.

JUDSON H. MANSFIELD.